UNITED STATES PATENT OFFICE.

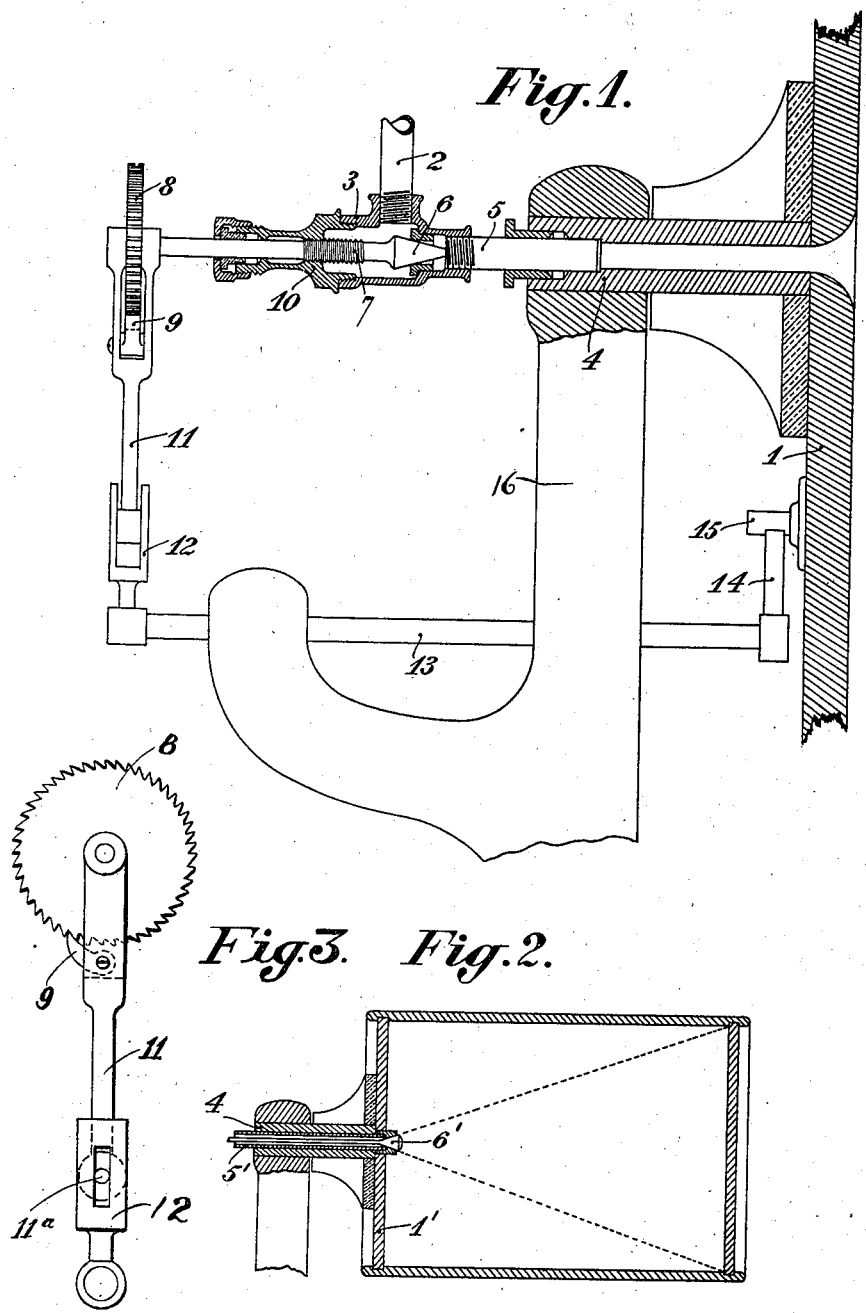

ANDERS CARL AUGUST ZEUTHEN, OF SILKEBORG, DENMARK.

CHURN OR CHURN-KNEADER.

1,379,950.  Specification of Letters Patent.  Patented May 31, 1921.

Application filed May 17, 1916. Serial No. 98,003.

*To all whom it may concern:*

Be it known that I, ANDERS CARL AUGUST ZEUTHEN, residing at Silkeborg, Denmark, and whose post-office address is Silkeborg, in the Kingdom of Denmark, have invented certain new and useful Improvements in or Relating to Churns or Churn-Kneaders; and I do hereby declare the following to be a full, clear, and exact description of the invention, such as will enable others skilled in the art to which it appertains to make and use the same, reference being had to the accompanying drawings, which form a part of this specification.

This invention refers to churns and more particularly churn-kneaders, in which the margarin is separated from its emulsion by direct cooling with water. The invention is characterized in that, as soon as the crystallization has begun, the water is supplied automatically, each supply being uniform, no attention or practice being necessary on the part of the workman, and in that there is no possibility of mistake which could damage the consistency of the margarin.

The drawing shows one form of construction, by way of example, in which the automatic water supply takes place through the rear supporting-axle of a churn-kneader.

Figure 1 is a vertical sectional view partly in elevation showing the controlling-device of the water-valve.

Fig. 2 is a similar view showing another manner of disposing the valve.

Fig. 3 is a detail view of the mechanism for operating the valve.

The water is conducted into the churn 1 of which the rear wall only is shown in Fig. 1, through a pipe 2, a pipe-coupling 3, and a pipe 5 having a bearing in the hollow supporting-axle 4, at the outer end of which pipe there is a valve 6 in the shape of an acute cone. By means of a ratchet-wheel 8 and pawl 9 the screw-threaded valve-rod 7 can be screwed out through a nut 10 in the pipe-coupling by turning the lever 11 of the ratchet. This turning movement is effected by means of a slotted fork-arm 12 on a revoluble axle 13 slidably and rotatably mounted in the bracket member 16, a pin 11$^a$ of the lever 11 slidably engaging the slot. The axle also carries another arm 14, which lies in the path of the pin 15 on the churn 1, the pin 15 engaging the arm 14 upon each revolution of the churn, turning the arm 12 and the ratchet lever and thereby gradually rotating ratchet wheel 8, a spring 12$^a$ returning the parts to normal position. The members 8—14 are thus mutually connected so that they follow the inward and outward movement of the valve, and the pin 15 is just long enough to pass free of the arm 14 when the valve is entirely open. Because of the number of ratchet teeth and the fineness of the threads on the valve, this intermittent and gradual opening movement of the valve is quite slow. The details shown and set forth are of no significance to the invention, and they can be altered in many ways admitting of the same results, namely, that the water is automatically supplied from the beginning and always in a uniform manner.

In the form of construction shown in Fig. 2 the valve 6' has its seat at the inner end of the pipe 5', and the conical shape of the valve and its seat is such that a part of the water, by means of the pressure existing in the pipe 5' will be squirted all the way over to the front wall of the churn 1', so that the cooling effect is equally distributed throughout the whole churn, which is of importance. To the same end, the pipe 5' shown in Fig. 1 can be made to project a suitable distance into the churn, and may be provided with a perforated extension, and in the churn there may be suitable surfaces which have a mixing effect on the emulsion in the longitudinal direction of the churn.

I claim—

In a rotating churn, water supply means, regulating means therein adapted to regulate the water supply, and controlling means for operating said regulating means, said controlling means consisting of means adapted to operate said controlling means to a predetermined degree to in turn operate said regulating means to admit a predetermined supply of water to said churn, and a pin on said churn adapted to operate said last named means by the rotation of said churn, said last named means adapted to move beyond the outer end of said pin when said regulating means is moved to its full open position.

In testimony that I claim the foregoing as my invention I have signed my name in presence of two subscribing witnesses.

ANDERS CARL AUGUST ZEUTHEN.

Witnesses:
P. HOFMAN-BARY,
ERNEST BOUTARD.